(12) United States Patent
Chang et al.

(10) Patent No.: US 8,189,441 B2
(45) Date of Patent: May 29, 2012

(54) METHOD OF RECOGNIZING TRACK PITCH OF OPTICAL DISK

(75) Inventors: Yao-Wen Chang, Hsinchu (TW); Pin-Ju Wu, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 12/779,956

(22) Filed: May 14, 2010

(65) Prior Publication Data
US 2011/0211434 A1 Sep. 1, 2011

(30) Foreign Application Priority Data
Feb. 26, 2010 (TW) ................................ 99105689 A (51) Int. Cl.
*G11B 27/36* (2006.01)
*G11B 7/00* (2006.01)
*G11B 20/10* (2006.01)

(52) U.S. Cl. .................. 369/53.2; 369/44.11; 369/44.25; 369/44.26; 369/44.29; 369/47.37; 369/44.28

(58) Field of Classification Search ................ 369/53.2, 369/44.11, 44.25, 44.26, 44.29, 53.28, 47.37, 369/51, 44.28
See application file for complete search history.

(56) References Cited

U.S. PATENT DOCUMENTS

| | | | |
|---|---|---|---|
| 2003/0043700 A1* | 3/2003 | Chan et al. | 369/30.17 |
| 2003/0090972 A1* | 5/2003 | Handa et al. | 369/47.4 |
| 2003/0123354 A1* | 7/2003 | Takahashi | 369/53.2 |
| 2006/0028941 A1* | 2/2006 | Takahashi | 369/47.36 |
| 2007/0165499 A1* | 7/2007 | Helwegen et al. | 369/44.28 |

FOREIGN PATENT DOCUMENTS

| | | |
|---|---|---|
| TW | 494388 | 7/2002 |
| TW | I261241 | 9/2006 |
| TW | I304582 | 12/2008 |

* cited by examiner

*Primary Examiner* — Joseph Feild
*Assistant Examiner* — Aneeta Yodichkas
(74) *Attorney, Agent, or Firm* — Jianq Chyun IP Office (57) ABSTRACT

A method of recognizing a track pitch of an optical disk, adapted for an optical disk player, is provided. The method includes the steps of driving an optical pickup head to a predetermined position, so that the optical pickup head and the spindle motor are a predetermined distance apart, reading a data sector address, and recognizing the magnitude of the track pitch of the optical disk according to the value of the data sector address.

12 Claims, 11 Drawing Sheets

METHOD OF RECOGNIZING TRACK PITCH OF OPTICAL DISK

CROSS-REFERENCE TO RELATED APPLICATION

This application claims the priority benefit of Taiwan application serial no. 99105689, filed on Feb. 26, 2010. The entirety of the above-mentioned patent application is hereby incorporated by reference herein and made a part of specification.

BACKGROUND OF THE INVENTION

1. Field of the Invention

The invention generally relates to a method of recognizing a track pitch of an optical disk, and more particularly to a method of recognizing the track pitch of the optical disk requiring one tracking operation.

2. Description of Related Art

The optical disk has become a popular storage medium due to its large storage capacity. Likewise, optical disk players for reading and writing optical disks have become indispensable in consumer computing and home entertainment devices (e.g., in music and speaker systems, and in digital players).

A surface of an optical disk has data tracks for storing data, and the data tracks are presented in a spiral shape, circling from an inner position of the optical disk outward. The data tracks have a plurality of data sectors, and each of the data sectors has an unique data sector address for recognition. The data sector addresses are disposed by accumulation coding from an inner position on the optical disk outward. In some conventional optical disks, the standard track pitch is decreased in order to expand the storage capacity of the optical disk. On the other hand, an optical disk player has an optical pickup head to access the data on the data tracks. Please refer to FIG. 1, which is a schematic view of a conventional optical disk player system. A spindle motor 120 is configured to rotate an optical disk 110, and an optical pickup head 140 is configured to read a data sector on a track. When the optical disk player performs a long distance track search, a sled motor 130 can be used to spin a screw 150 to drive the optical pickup head 140 from a current position D to a position E on a target track.

Figure 1:
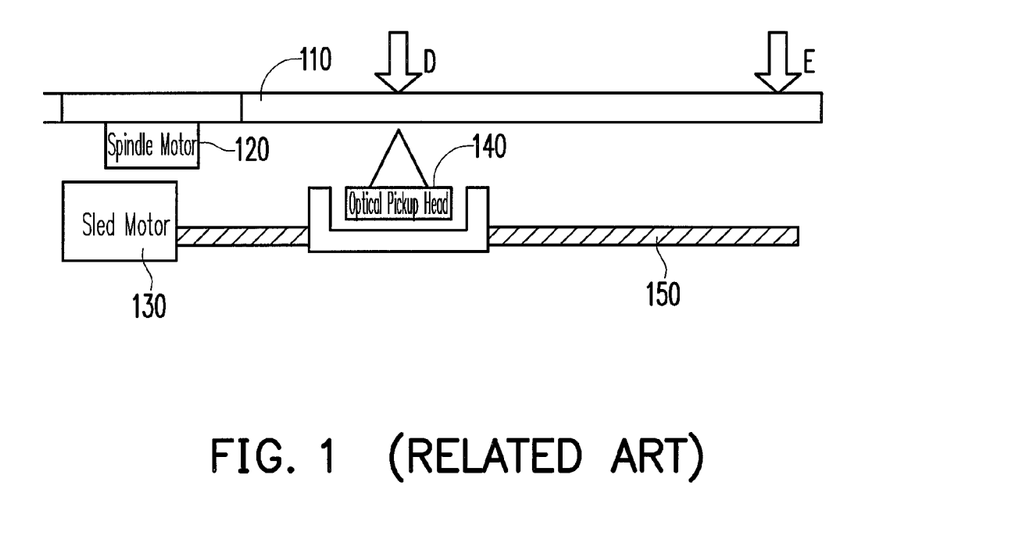
FIG. 1 is a schematic view of a conventional optical disk player system.

Since a distance between position D and position E is equivalent to a number of tracks therebetween multiplied by the track pitch, the optical disk player can calculate beforehand a required move distance, then employ the sled motor 130 to drive the optical pickup head 140. However, since there may be various types and configurations of optical disks, the track pitch thereof are different. When calculating the move distance of the optical pickup head, an overshoot or an undershoot of a read distance can result if an incorrect track pitch is used, and the optical pickup head 140 cannot be rapidly driven to position E. For example, when a track pitch of 1.6 µm for a standard Compact Disc (CD) is used to perform a tracking computation of a CD-Recordable (CD-R) having a track pitch of 1.4 µm, since the track pitch of the standard CD is larger, an issue of an overshooting move distance being generated results. Hence, track pitch detection significantly impacts a long distance target track seeking.

SUMMARY OF THE INVENTION

An aspect of the invention provides a method of recognizing a track pitch of an optical disk, adapted for an optical disk player, the method only needing to read a data sector address at a single point to determine a magnitude of the track pitch of the optical disk, thereby a detection time of the track pitch for the optical disk player may be decreased.

Another aspect of the invention provides a method of recognizing a track pitch of an optical disk, employing a reference disk data for comparison with a target optical disk, the method capable of directly obtaining the magnitude of the track pitch of the target optical disk.

An aspect of the invention provides a method of recognizing a track pitch of an optical disk, adapted for an optical disk player, the optical disk player having a spindle motor and an optical pickup head, the spindle motor configured to rotate an optical disk, the optical pickup head configured to read the optical disk, and the method including the following steps. First, the optical pickup head is driven to a predetermined position, so that the optical pickup head and an axis of a spindle motor are a predetermined distance apart. A data sector address on the optical disk is read. Thereafter, a magnitude of the track pitch of the optical disk is recognized according to a value of the data sector address.

According to an embodiment of the invention, the aforesaid method further includes comparing the data sector address with a threshold value to determine whether the optical disk is a large track pitch optical disk or a small track pitch optical disk.

According to an embodiment of the invention, the step of reading the data sector address on the optical disk further includes detecting a cross-track speed and a cross-track direction, and when the cross-track speed is lower than a target value and the cross-track direction matches a predetermined direction, reading the data sector address on the optical disk. Here, the cross-track direction refers to a movement direction of a track of the optical disk relative to the optical pickup head.

According to an embodiment of the invention, the step of detecting the cross-track speed and the cross-track direction further includes detecting the cross-track speed according to a cross-track signal or a radio frequency ripple (RFRP) signal, and detecting the cross-track direction according to the cross-track signal and the RFRP signal. It should be noted that, the cross-track speed can be derived by either the cross-track signal or the RFRP signal, whereas deriving the cross-track direction requires a comparison between the cross-track signal and the RFRP signal.

According to an embodiment of the invention, the aforesaid predetermined direction refers to the track of the optical disk moving inside-out or outside-in relative to the optical pickup head.

Another aspect of the invention provides a method of recognizing a track pitch of an optical disk, adapted for an optical disk player, the optical disk player having a spindle motor and an optical pickup head, the spindle motor configured to rotate an optical disk, the optical pickup head configured to read the optical disk, and the method including the following steps. First, a reference disk data is stored, in which the reference disk data includes a track pitch of a reference optical disk and an address corresponding to a predetermined read distance. Next, an eccentric track number of a target optical disk is detected. The optical pickup head is driven to a predetermined position to read a data sector address on the target optical disk. Thereafter, a track pitch of the target optical disk is calculated according to the data sector address, the eccentric track number, and the reference disk data.

According to an embodiment of the invention, the step of detecting the eccentric track number of the target optical disk includes detecting a cross-track number read by the optical pickup head in a predetermined read rotation number, and calculating the eccentric track number according to the predetermined read rotation number and the cross-track number. In summary, embodiments of the invention broadly described herein directly employ the data sector address to recognize the magnitude of the track pitch of the optical disk, and employ the cross-track speed and the cross-track direction to select a tracking on position, so as to prevent a structure de-centering or a disk eccentricity from affecting an accuracy of a detection result. Embodiments of the invention do not require reading a data content of the optical disk. By merely reading the data sector address on the optical disk, the magnitude of the track pitch of the optical disk can be detected, thereby preventing an instability caused by a faulty disk data.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 2:
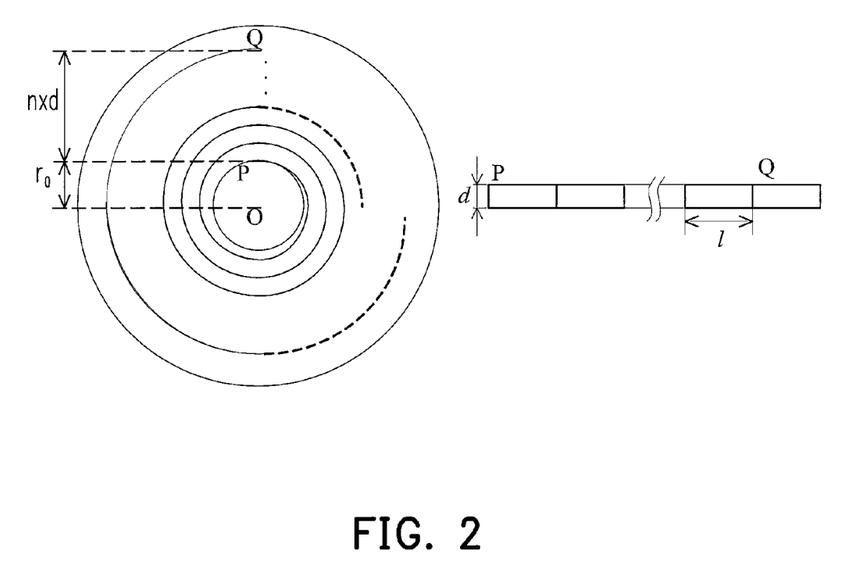
FIG. 2 is a schematic view of a disk track in accordance with a first embodiment of the invention.

Please refer to FIG. 2, which is a schematic view of a disk track in accordance with a first embodiment of the invention. In FIG. 2, O is a center position of an optical disk, P is a beginning position of the tracks, Q is a track of the optical disk, and n is a number of tracks from a beginning track to the track Q, and d is a track pitch. A distance between the positions O and P is $r_0$, and a distance between the positions P and Q may be represented by $n \times d$. The tracks of the compact disk have a spiral trajectory, formed by a plurality of connecting data sectors. An expansion of the tracks at the left of FIG. 2 into a straight line can be represented by a diagram at the right of FIG. 2. The data tracks are represented as a data band assembled by a plurality of rectangular data sectors, where a length of each of the data sectors is l.

Figure 3:
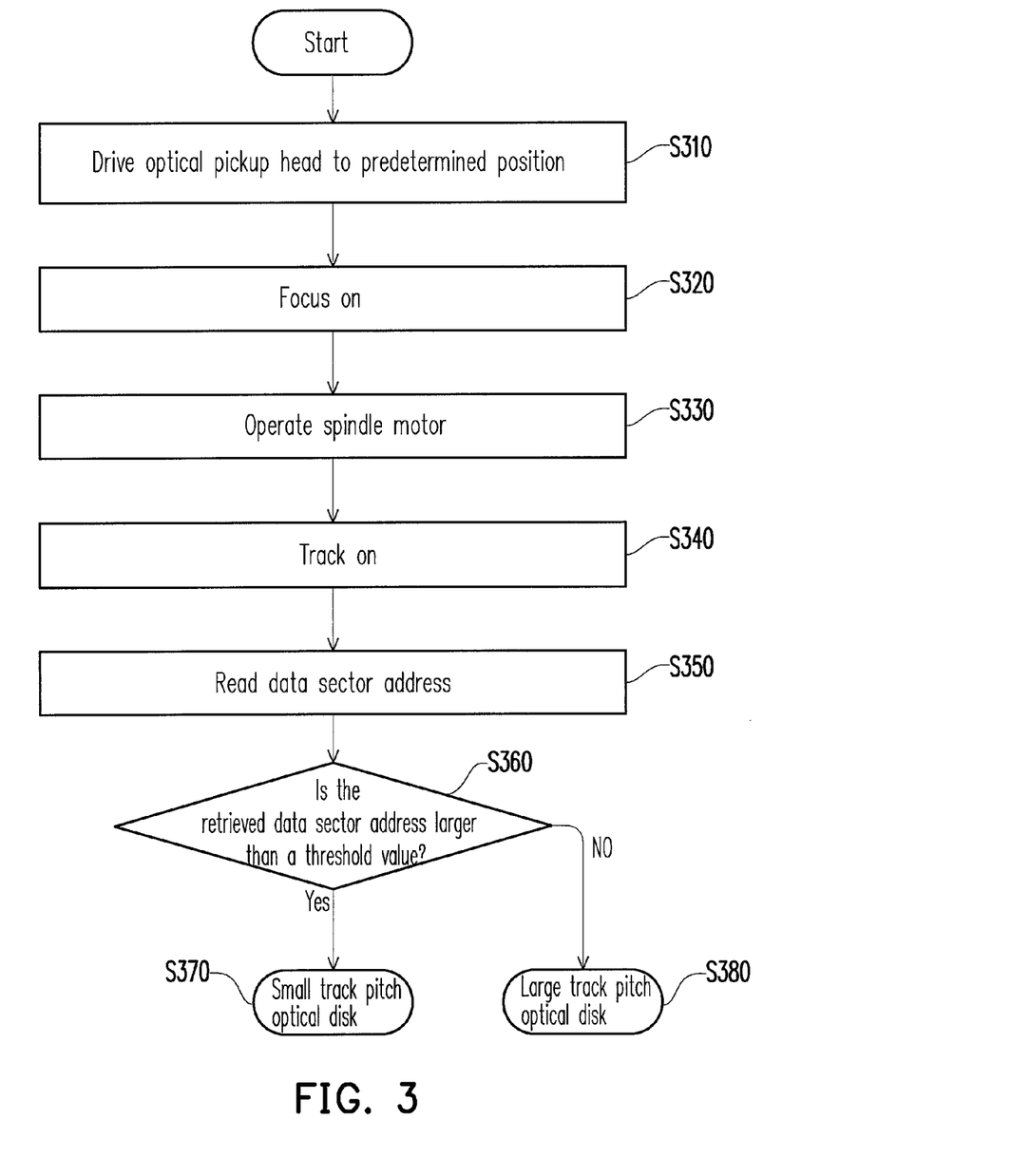
FIG. 3 is a flow diagram of a method of recognizing a track pitch of an optical disk in accordance with an embodiment of the invention.

Each of the data sectors has a data sector address, and the data sector addresses are coded by an accumulation manner from the inner tracks to the outer tracks of the optical desk. Therefore, a data sector address closer the center O of the optical disk has a progressively smaller address, and a data sector address closer to the track Q has a progressively larger address. Since the track pitch d is much smaller than a track spiral radius, the tracks are similar to a plurality of concentric circles. From the foregoing description, an circular area at the left of FIG. 2 and a rectangular area at the right of FIG. 2 are equivalent and may be represented by the following expression:

$$ID \times l \times d = \pi \times \lfloor (n \times d + r_0)^2 - r_0^2 \rfloor$$

or $$ID \times d = \frac{\pi \times [(n \times d + r_0)^2 - r_0^2]}{l}$$

in which ID is a data sector address on the optical disk, and $n \times d + r_0$ and $r_0$ are fixed values when an optical pickup head 140 is driven to a predetermined position relative to a spindle motor 120. According to an optical disk standard, the length l of a typical data sector is also a fixed value, therefore as shown in the expression above, the data sector address (ID) and the track pitch (d) are inversely proportional. That is, the smaller the track pitch (d), the larger the data sector address (ID) read. The present embodiment of the invention adopts the above-described principle to determine a magnitude of the track pitch according to a value of the data sector address (ID). Please refer to FIGS. 1-3 together, in which FIG. 3 is a flow diagram of a method of recognizing a track pitch of an optical disk in accordance with the present embodiment of the invention.

First, the optical pickup head 140 is driven to a predetermined position, so that the optical pickup head 140 and the spindle motor 120 are a predetermined distance apart. In other words, the optical disk is read at a fixed position (Step S310). Thereafter, a focusing on (FCS ON) process of the optical pickup head 140 is performed (Step S320). After focusing is complete, the spindle motor 120 is operated to rotate the optical disk (Step S330). At this time, the optical pickup head 140 can perform a tracking on process (TRK ON process) (Step S340) and a read a data sector address of the optical disk (Step S350). Then, the data sector address read is compared with a threshold value to determine whether the retrieved data sector address is larger than the threshold value (Step S360). If the data sector address is larger than the threshold value, then the optical disk is a small track pitch optical disk (Step S370). If the data sector address is smaller than the threshold value, then the optical disk is a large track pitch optical disk (Step S380).

According to the foregoing description, the present embodiment uses an inverse proportional relationship between the magnitude of the track pitch and the data sector address, and a data sector address read at a fixed reading distance to determine whether the optical disk is the large track pitch or the small track pitch optical disk. Since the track pitch of the optical disk is typically set according to a standard, therefore, by knowing whether the optical disk is a large or small track pitch optical disk, a possible track pitch value thereof may be derived. For example, the track pitch of a CD is 1.6 μm, hence the CD may be categorized as the large track pitch optical disk. On the other hand, if the track pitch of a Double Video CD (DVCD, which follows a non-standard specification of the CD) is 1.33 μm, then the DVCD may be categorized as the small track pitch optical disk. By using a track pitch categorizing process, during the tracking process a same or a similar track pitch may be obtained to perform the tracking, and thereby a tracking speed is enhanced.

Second Embodiment

In an ideal situation, a geometric center and a center of the spiral track of the optical disk should be located on a same point, such that when the spindle motor rotates the optical disk, the track sectors of the optical disk rotate around the center of the optical disk. However, when a deviation occurs during fabrication of the optical disk, the center of the spiral track and the geometric center do not coincide on the same point, and this is referred to as eccentricity. When an axis passing through the center of the optical disc and an axis parallel to the screw of the optical disk player do not match, and an axis passing through the object lens and an axis parallel to the screw of the optical disk player do not match, this structure is referred to as a de-centered structure. When an optical disk with an eccentricity or a de-centered structure rotates, the tracks thereof are shifted radially an amount relative to the optical pickup head. Therefore, the optical pickup head on the fixed position will detect a cross-track signal, and the tracks are moved inside or outside relative to the optical pickup head. In the present embodiment of the invention, a method of recognizing a track pitch of an optical disk is described, in which the optical disk has an eccentricity issue or a structure is de-centered.

Figure 4:
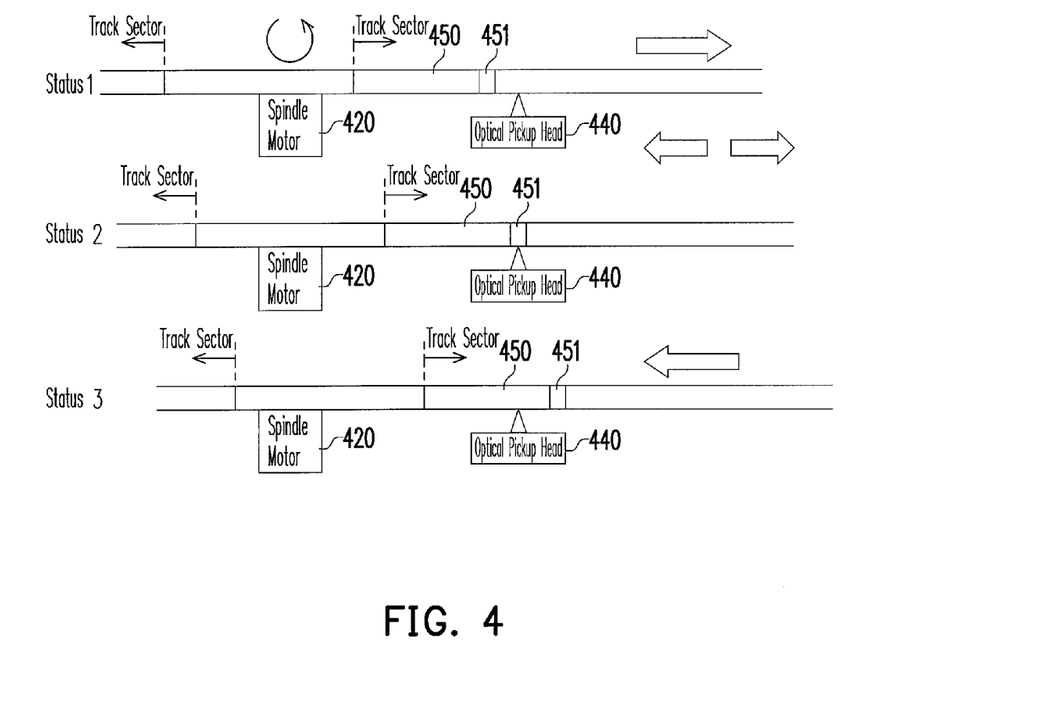
FIG. 4 is a schematic view of eccentricity statuses in accordance with a second embodiment of the invention.

Please refer to FIG. 4, which is a schematic view of eccentricity statuses in accordance with a second embodiment of the invention. As shown in FIG. 4, an optical disk player has a spindle motor 420 and an optical pickup head 440. Since the optical disk has an eccentricity issue, therefore, even if the optical pickup head 440 has not been driven, a track 451 on an optical disk 450 may still shift radially relative to the optical pickup head 440. As shown in FIG. 4, the position of the optical pickup head 440 is fixed. Moreover, since a axis of the spindle motor 420 and the center of the optical disk 450 do not coincide on a same point, when the spindle motor 420 rotates the optical disk 450, an amount of positional shift due to the eccentricity issue causes the track 451 to move relative to the optical pickup head 440. As shown in statuses 1-3, the positional shifts of the track 451 due to eccentricity may be observed from the dispositional relationship between the track 451 and the optical pickup head 440.

Statuses 1-3 represent three relative positions between the track 451 and the optical pickup head 440 when the optical disk 450 is being rotated. Regarding status 1, since the eccentricity issue causes a side of the track regions to become closer to the axis of the spindle motor 420, a track position read by the optical pickup head 440 is far larger than the position of the track 451. Therefore the data sector address read by the optical pickup head 440 is larger than the data sector address of the track 451 position. In status 1, a cross-track direction detected by the optical pickup head 440 is inside-out, as shown by the arrow. That is, the track 451 moves from inward to outward relative to the optical pickup head 440. In other words, the data sector address detected by the optical pickup head 440 progressively decreases, and concurrently a cross-track speed thereof progressively accelerates.

In status 2, when the optical pickup head 440 reads the track 451, a cross-track direction may outside-in or inside-out. That is, when the optical pickup head 440 reads the track 451, the axis of the spindle motor 420 is near the track sectors on either side. At this time, the cross-track speed detected by the optical pickup head is the fastest, and thereafter, as the data sector addresses read become progressively smaller, the cross-track speed thereof progressively slows down. Status 3 represents when the positional shift is at a maximum, the track 451 moves to the right of the optical pickup head 440, and the cross-track direction is outside-in (as depicted by the arrow). In other words, the track 451 moves from outward to inward relative to the optical pickup head 440. At this time, the track 451 is positioned to the right of the optical pickup head 440. The track read by the optical pickup head 440 is closest to the center of the optical disk 450, and the data sector address of the track read is small. Statuses 3 and 1 represent when the cross-track direction turns, meaning the cross-track speed thereof is low and suitable for performing the tracking on process to read the data sector address.

Figure 5:
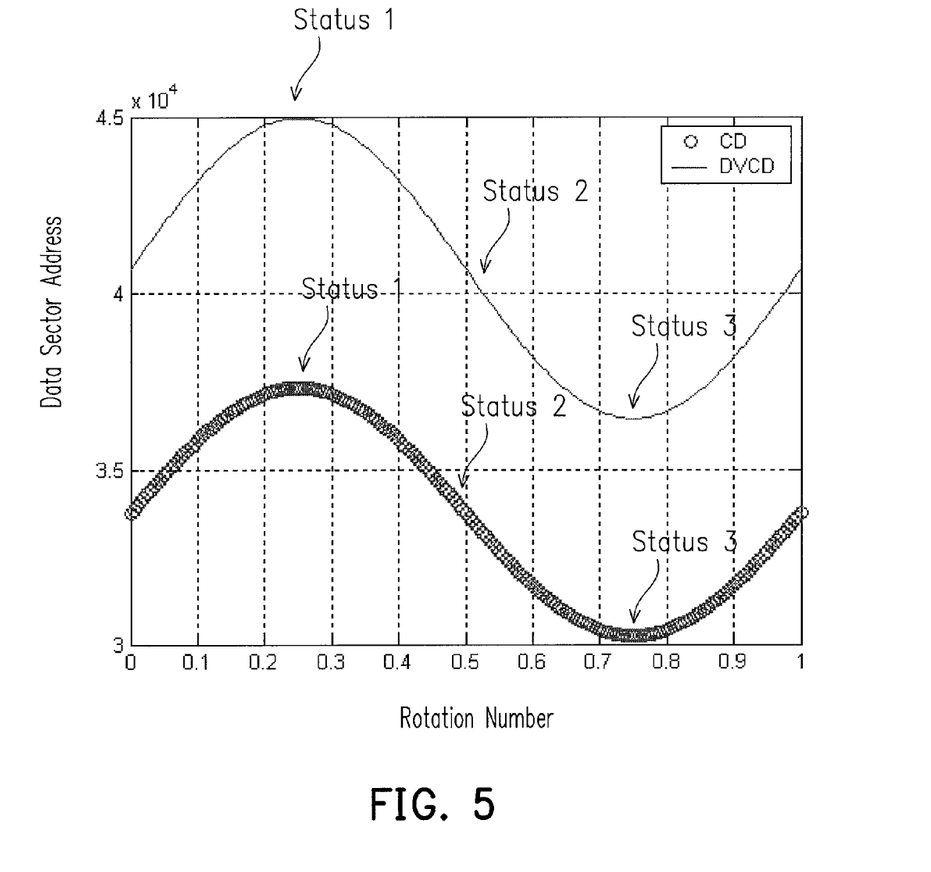
FIG. 5 is a curve diagram illustrating changes to the data sector addresses in accordance with the second embodiment of the invention.

Due to the eccentricity issue, when the spindle motor 420 rotates the optical disk 450, the track read by the optical pickup head 440 changes according to a relative position of the optical disk 450. As shown in FIG. 5, the data sector address read vary in a sine wave pattern. FIG. 5 is a curve diagram illustrating changes to the data sector addresses in accordance with the second embodiment of the invention. FIG. 5 illustrates data sector addresses of two types of optical disks, a CD (74 minutes and 1.6 μm standard track pitch) and a DVCD (90 minutes and 1.33 μm track pitch), read respectively where the optical pickup head 440 is 30 mm away from the axis of the spindle motor 420, and where a composite center shift of a structure core (axis of the spindle motor 420) and the optical disk is 480 μm. The vertical coordinate in FIG. 5 represents data sector addresses read at the 30 mm position, whereas the horizontal coordinate represents a number of rotations of the optical disk.

As shown in FIG. 5, by reading a CD or DVCD with a center shift at a fixed position, a curve of the data sector addresses read has a sine wave pattern, and each position on the curve can correspond to statuses 1-3 depicted in FIG. 4. Taking the CD curve as an example, the data sector address read in status 1 is the largest, and here the cross-track direction is inside-out. Then, a center portion of the curve correspond to status 2. Here, the cross-track direction is inside-out and the cross-track speed is relatively fast, such that the data sector addresses read are progressively decreasing. Thereafter, status 3 corresponds to the cross-track direction changing from inside-out to outside-in. Here, the data sector addresses read are lower, and the cross-track speed is slower. In the present embodiment, statuses such as statuses 1 and 3 having slower cross-track speeds are used to perform the tracking on process, such that the data sector addresses may be readily retrieved. However, the present embodiment of the invention is not limited thereto, and as long as the optical pickup head 440 can accurately perform the tracking on process, the spirit and the scope of the invention is met.

Since the shifted distance due to eccentricity is typically far larger than the track pitch, therefore, even if the position of the optical pickup head 140 is fixed, the data sector addresses detected will still have a large amplitude of variation. Accordingly, when using the data sector address to recognize the magnitude of the track pitch of the optical disk, besides fixing the position of the optical pickup head 140, the detection needs to be performed under a same status (e.g., statuses 1-3), in order to properly determine whether the optical disk is a large track pitch or a small track pitch optical disk. For example, if the optical disk player always performs the tracking on process under status 1, the data sector addresses are mostly detected when the track 451 moved inward. Therefore, whether the optical disk has the large or small track pitch may be determined directly from the data sector addresses thereof. Similarly, the optical disk player can also perform the tracking on process under status 2 or 3 to detect the track pitch. An error caused by the eccentricity issue may be compensated by performing the tracking on process under the same status, so that the magnitude of the track pitch can be directly determined from the data sector address. As shown in FIG. 5, when detecting under the same status (e.g., statuses 1-3), the data sector addresses of the CD and the DVCD vary significantly. However, when comparing status 1 of CD and status 3 of DVCD, the data sector addresses do not exhibit a large difference. Therefore, to minimize the effect the eccentricity issue has on a detection result, the comparison needs to be performed under a same condition.

Figure 6:
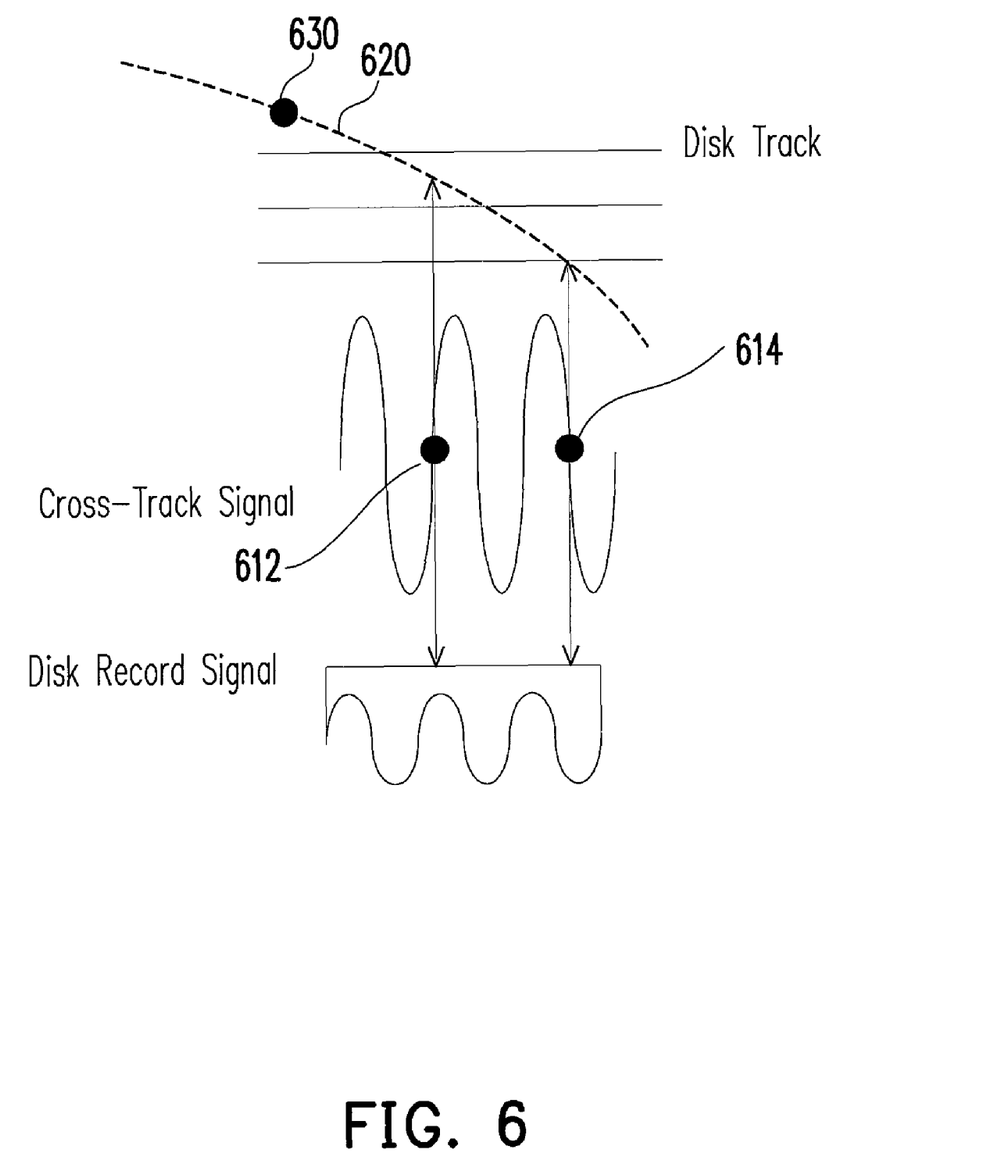
FIG. 6 is a schematic view of a cross-track signal in accordance with the second embodiment of the invention.
Figure 7:
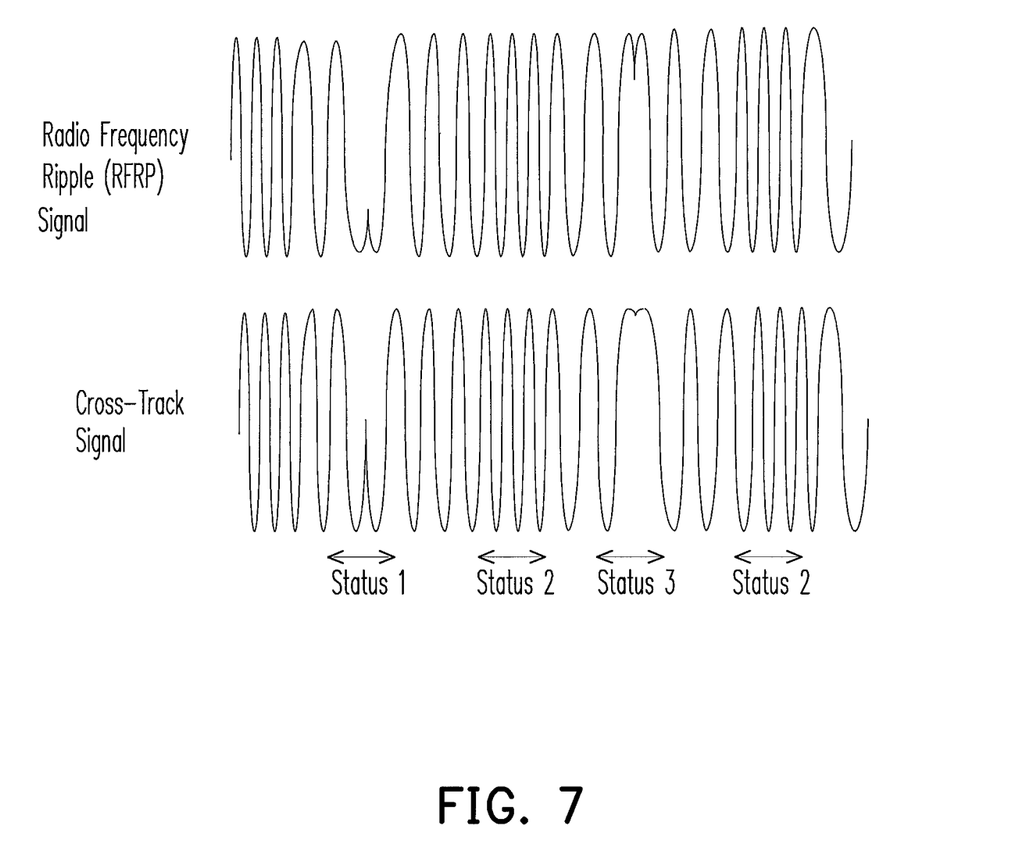
FIG. 7 is a schematic view of a cross-track signal and a radio frequency ripple (RFRP) signal in accordance with the second embodiment of the invention.

The optical disk player can detect the cross-track speed and the cross-track direction by using the cross-track signal and a radio frequency ripple (RFRP) signal. Please refer to FIGS. 6-7, in which FIG. 6 is a schematic view of a cross-track signal in accordance with the second embodiment of the invention, and FIG. 7 is a schematic view of a cross-track signal and a radio frequency ripple signal in accordance with the second embodiment of the invention. As shown in FIG. 6, a light spot 630 represents a position of a light beam projected by the optical pickup head 440 on the optical disk. The light spot 630 moves on the optical disk according to the rotation of the optical disk 450, and a path of the light spot 630 is shown by a dotted line 620. The optical pickup head 440 generates the cross-track signal when passing the disk track, and a cycle of the cross-track signal represents the light spot 630 crossing a disk track. Here, a signal spot 612 represents the light spot 630 being away from the disk track, and a signal spot 614 represents the light spot 630 being on the disk track.

A disk record signal is at a maximum when the optical pickup head 440 passes the disk track. The RFRP signal obtained by subtracting the envelops of the disk record signal, and reflects whether the optical pickup head 440 is on the track. When the light spot 630 is positioned on the track, the cross-track signal and the RFRP signal has a phase difference of 90°. According to either the cross-track signal or the RFRP signal, the cross-track speed may be determined. Moreover, by using a phase lead or a phase lag of the cross-track signal and the RFRP signal, a relative movement direction may be determined. When the cross-track signal leads the RFRP signal, this represents the track is moving inside-out relative to the optical pickup head 440. Moreover, when the cross-track signal lags the RFRP signal, this represents the track is moving outside-in relative to the optical pickup head 440. The present embodiment employs the cross-track signal or the RFRP signal as a reference signal for detecting the cross-track speed of the optical disk. Here, a high signal frequency represents a fast cross-track speed. If a frequency of the aforesaid reference signal is below a target value, than this represents the disk track is moving slower relative to the optical pickup head, and the tracking on process performed at this time can be represented by statuses 1 or 3 in FIG. 4.

In the present embodiment of the invention, status 3 is used in an example for performing the tracking on process to describe a detection method of the track pitch. Please refer to FIG. 8, which is a flow diagram of a method of recognizing a track pitch of an optical disk in accordance with the second embodiment of the invention. First, the optical pickup head 440 is driven to a predetermined position, so that the optical pickup head 440 and the spindle motor 420 are a predetermined distance apart. In other words, the optical disk is read at a fixed position (step S810). Thereafter, a focusing on process (FCS ON) of the optical pickup head 440 is performed (Step S820). After focusing is complete, the spindle motor 420 is operated to rotate the optical disk (Step S830). Then, whether the cross-track speed is lower than the target value is determined (Step S840). Additionally, whether the cross-track direction matches with a predetermined direction is determined, that is, whether the track is moving outside-in relative to the optical pickup head is determined (Step S850). The tracking on process (Step S860) and a reading process of the data sector address (Step S870) are performed when the cross-track speed is lower than the target value and the track is moving outside-in relative to the optical pickup head (Step S860). Thereafter, the data sector address read is compared with a threshold value to determine whether the retrieved data sector address is larger than the threshold value (Step S880). If the data sector address is larger than the threshold value, then the optical disk is a small track pitch optical disk (Step S890). If the data sector address is smaller than the threshold value, then the optical disk is a large track pitch optical disk (Step S895).

Figure 8:
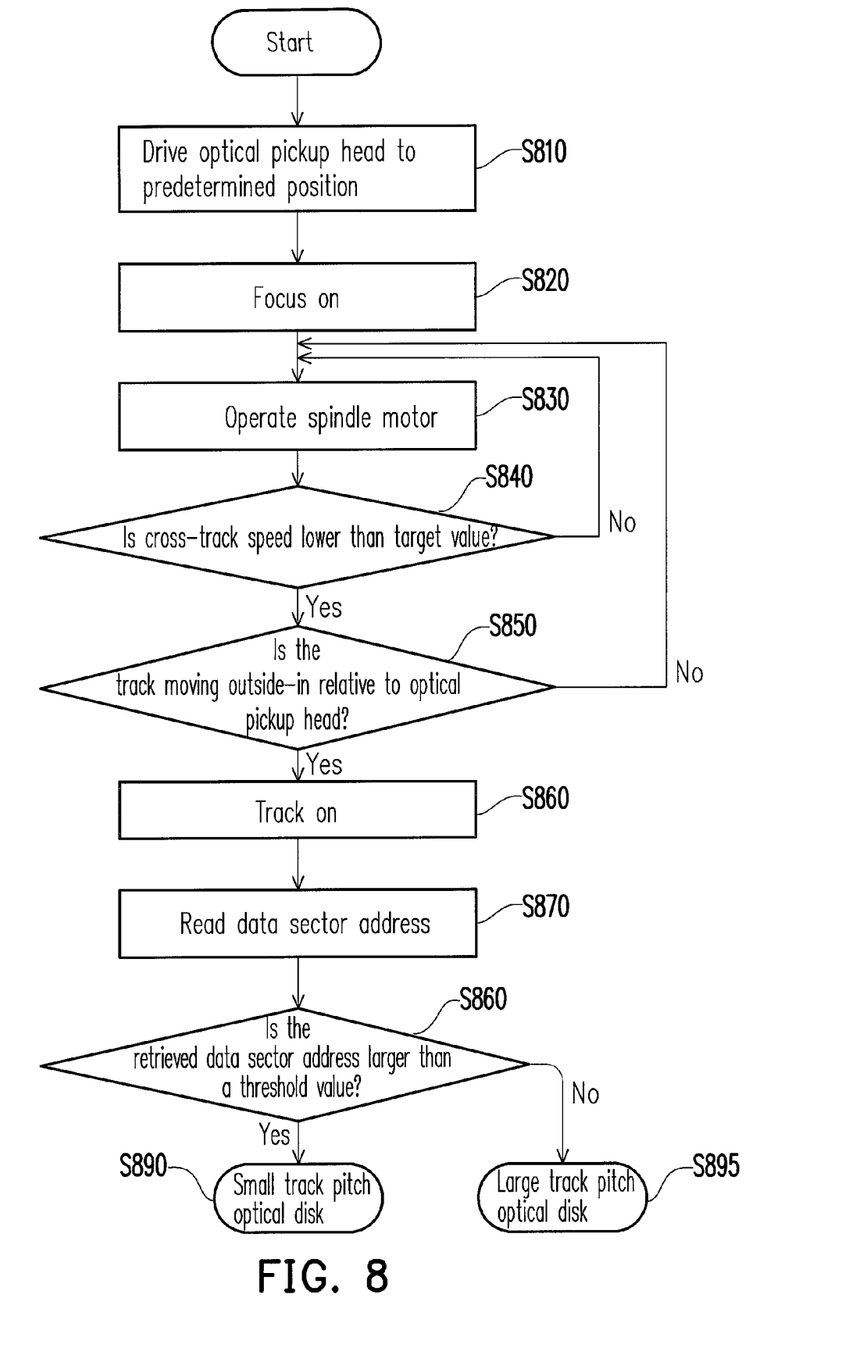
FIG. 8 is a flow diagram of a method of recognizing a track pitch of an optical disk in accordance with the second embodiment of the invention.

It should be noted that an alternative for the aforementioned step S850 may be to detect whether the track is moving inside-out relative to the optical pickup head 440, as in status 1. The present embodiment of the invention is limited as long as the status of the optical disk detected has the same testing conditions as the threshold value. Moreover, the sequence of the step S840 and the step S850 may be adjusted or combined, and the present embodiment is not limited thereto. In light of the foregoing description, the present embodiment employs the cross-track speed and the cross-track direction to select the corresponding disk position for reading the data sector address, and accordingly compensate for a positional shift difference caused by the eccentricity issue of the optical disk.

Figure 9:
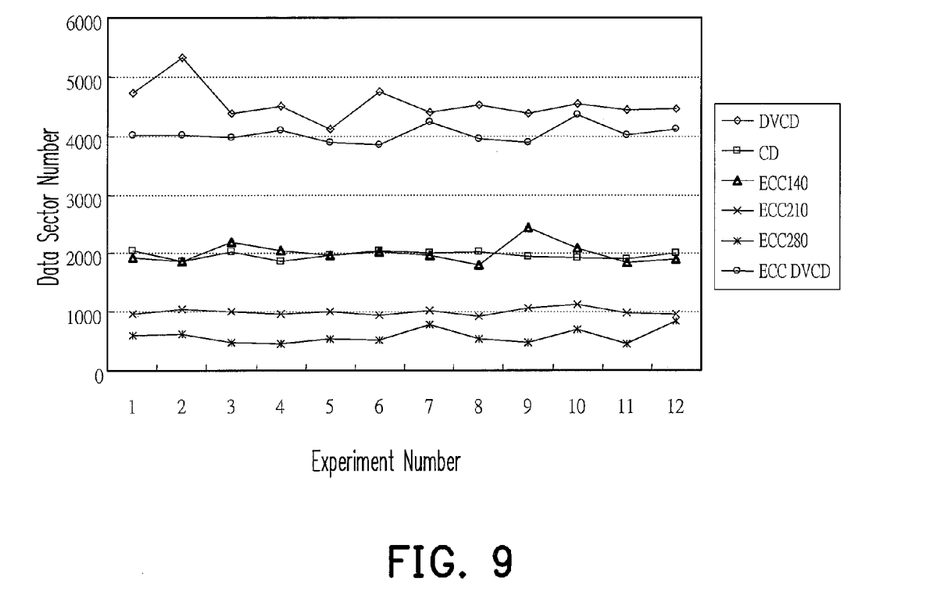
FIG. 9 is a schematic view of experimental results in accordance with the second embodiment of the invention.

FIG. 9 is a schematic view of experimental results in accordance with the second embodiment of the invention. Optical disks tested in experiments include DVCD, CD, ECC140, ECC210, ECC280, and ECC DVCD. ECC280 refers to a normal optical disk having a common track pitch and a center shift of 280 μm, ECC210 refers to a normal optical disk having a common track pitch and a center shift of 210 μm, ECC140 refers to a normal optical disk having a common track pitch and a center shift of 140 μm, CD refers to a normal optical disk having a common track pitch, DVCD refers to an optical disk having a denser track pitch, and ECC DVCD refers to an optical disk having a denser track pitch and having a degree of eccentricity.

A method of experimentation includes driving the optical pickup head 440 to the predetermined position, and when the cross-track speed of the disk track relative to the optical pickup head 440 is under the set target value, and the disk track is moving outside-in relative to the optical pickup head, the tracking on process is performed on the disk track. Thereafter, the data sector address of the optical disk when tracked on is read. In the experimental results, the data sector address is converted into a data sector numerical unit. For example, the 1:05:62 data sector number is equivalent to 1*60*75+ 5*75+62=4937. In FIG. 9, the horizontal axis represents an experiment number, whereas the vertical axis represents the data sector number. For the aforesaid types of optical disks, by considering the data sector address number converted from the data sector address read under the predetermined distance, it may be seen that the more dense the track pitch of the optical disk, the larger the data sector number read out. Moreover, the larger the degree of eccentricity, the smaller the data sector number. In this method, if the data sector number 3000 is used as a threshold value, then a data sector number larger than the threshold value means an optical disk having a looser packed track pitch. Conversely, a data sector number smaller than the threshold value means an optical disk having a denser track pitch.

Accordingly, the present embodiment considers the effect the eccentricity of the optical disk has on the data sector address retrieved, and by using the cross-track direction and the cross-track speed as limiting conditions, the data sector address is read under the same conditions, and then compared with the threshold value. Since the conditions for detection had been set, the effect eccentricity has on the data sector address retrieved can be lowered, such that a more accurate detected value is obtained. Moreover, the types of track pitch of the optical disk sectors can be rapidly discerned, for example belonging to the large track pitch or the small track pitch optical disk.

The Third Embodiment

The disk position read out is affected by factors such as the magnitude of the track pitch and the degree of eccentricity of the optical disk. Please refer to FIG. 10, which is a schematic test view of a disk T and a disk S having two different track pitches and different center shifts in accordance with a third embodiment of the invention. The disk S is a standard disk with no center shift, whereas the disk T has a center shift K in the cross-track direction. A same distance X is used to read both disk T and disk S. In the disk S, a track on position relative to an axis of a spindle motor 12 can be represented as $R_0+N_s \times D_s$. In the disk T, a track on position relative to the axis of the spindle motor 12 can be represented as $R_0+K+N_t \times D_t$. Here, $R_0$ refers to a distance between the axis of the spindle motor 12 of the standard disk S to the inside of the track sector, Ns refers to a track number read on the disk S, Ds refers to a track pitch of the disk S, Nt refers to a track number read on the disk T, and Dt refers to a track pitch of the disk T.

Figure 10:
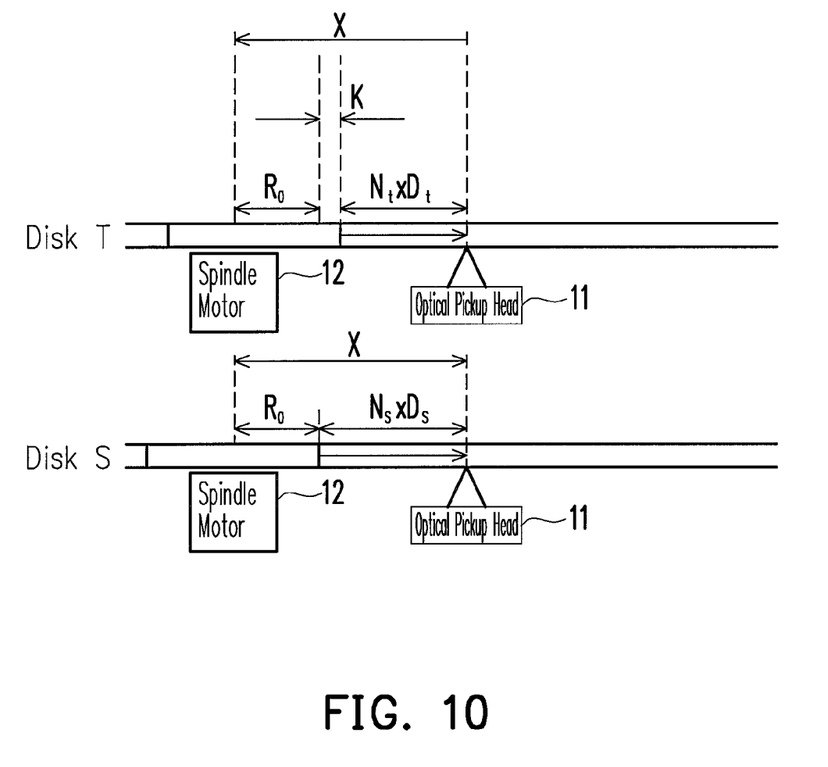
FIG. 10 is a schematic test view of a disk T and a disk S having two different track pitches and different center shifts in accordance with a third embodiment of the invention.

Since the same read distance is used for the two disks, the above expressions may be rewritten as $K+N_t \times D_t = N_s \times D_s$. Since the disk S is a reference optical disk, the data of the reference optical disk may first be recorded for comparison with the disk T, and then eliminate the variable K by calculating the center shift K.

Referring to FIG. 2 concurrently, the aforementioned expression which does not consider eccentricity is $$ID \times d = \frac{\pi \times [(n \times d + r_0)^2 - r_0^2]}{l}.$$

If $r_0+n \times d$ representing a tracking on at the predetermined position is a fixed value, then after rearrangements of the aforesaid two expressions, $ID \propto n \times (nd+2r_0)$ is obtained. Moreover, $nd+2r_0$ is a fixed value, ID and track number n are directly proportional, and therefore Nt may be known.

Thus, ignoring the effect of eccentricity, Nt and the retrieved address are directly proportional. Since the parameters Nt, K, Ns, and Ds are all known, the track pitch Dt of the disk T may be derived.

A method of calculating the aforesaid center shift K is described as follows. When a disk having a center shift K rotates, a cross-track number detected at a fixed position follows a rotation number of the disk. Therefore, a corresponding eccentric track number can be calculated by recording the rotation number and the track number detected at the fixed position. Since details for calculating the eccentric track number of the center shift K are described in Taiwan Patent No. 1304582, further description thereof is omitted hereinafter.

Figure 11:
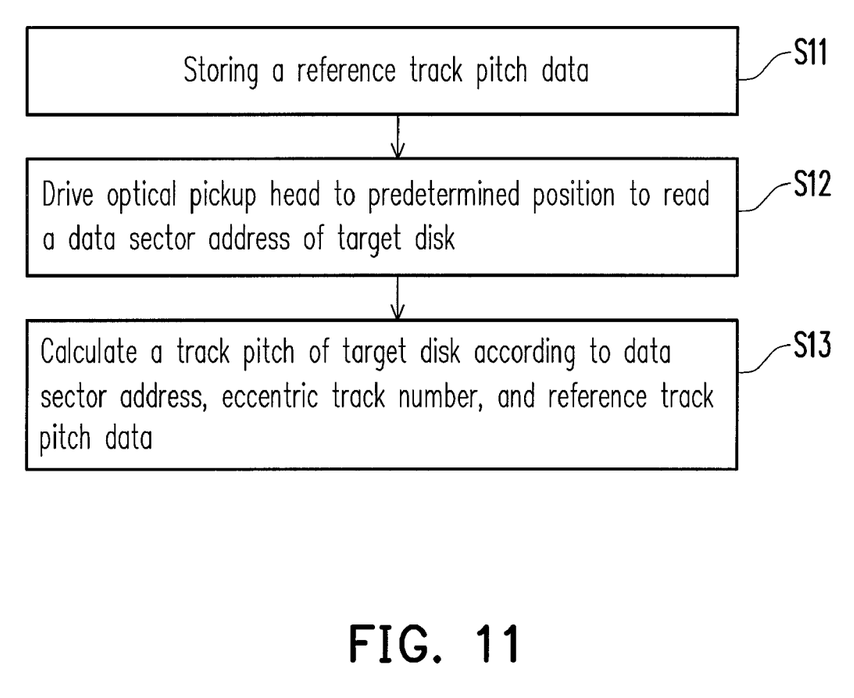
FIG. 11 is a flow diagram of a method of recognizing a track pitch of an optical disk in accordance with a third embodiment of the invention.

In other words, the present embodiment may employ a set of known reference disk data to derive the track pitch of the unknown disk. The aforesaid method can be grouped into a method of recognizing a track pitch of an optical disk, adapted for an optical disk player. Please refer to FIG. 11, which is a flow diagram of a method of recognizing a track pitch of an optical disk in accordance with a third embodiment of the invention. First, a reference track pitch data is stored, including a track pitch of a reference optical disk S, and an address corresponding to a predetermined read distance (e.g., a data sector address on the reference optical disk S, and a track number can be derived from the data sector address) (Step S11). Thereafter, an optical pickup head 11 is driven to the predetermined position to read the data sector address of a target optical disk T (Step S12). Next, the track pitch of the target optical disk T is calculated according to the data sector address, the eccentric track number, and a reference track pitch data.

In the present embodiment of the invention, a track on position may be chosen according to the described method in the second embodiment, and the track on process can be performed according to a track position relative to the disk detected using the cross-track speed and the cross-track direction. Applications can also be easily deduced by those of ordinary skills in the art according to the disclosure of the invention, and will not be described herein again.

In light of the foregoing, embodiments of the invention broadly described herein directly employ the data sector address to recognize the type of track pitch of the optical disk, and may determine the magnitude of the track pitch by reading data on a single point of the optical disk. By concurrently selecting a track on position according to the cross-track speed and the cross-track direction, the effects of structure de-centering or disk eccentricity on track pitch detection may be lowered. Therefore, manufacturing variations of optical disk players and optical disks may be prevented from affecting the accuracy of determining the magnitude of the track pitch.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of recognizing a track pitch of an optical disk, adapted for an optical disk player, the optical disk player having a spindle motor and an optical pickup head, the spindle motor configured to rotate an optical disk, the optical pickup head configured to read the optical disk, the method comprising:

driving the optical pickup head to a predetermined position so that the optical pickup head and an axis of the spindle motor is a predetermined distance apart;

reading a data sector address at a single point on the optical disk; and recognizing a magnitude of the track pitch of the optical disk according to a value of the data sector address, wherein the track pitch is calculated by following equation:

$$ID \times d = \frac{\pi \times [(n \times d + r_0)^2 - r_0^2]}{l},$$

in which ID is the data sector address on the optical disk, d is the track pitch, n is a number of tracks from a beginning track to a specific track, $r_0$ is a distance between a center position of an optical disk and a beginning position of the tracks, l is a length of each of the data sectors.

2. The method as claimed in claim 1, further comprising:
comparing the data sector address to a threshold value to determine whether the optical disk is a large track pitch optical disk or a small track pitch optical disk.

3. The method as claimed in claim 1, wherein the step of reading the data sector address on the optical disk further comprises:
detecting a cross-track speed and a cross-track direction; and
when the cross-track speed is lower than a target value and the cross-track direction matches a predetermined direction, reading the data sector address on the optical disk;
wherein the cross-track direction refers to a movement direction of a track of the optical disk relative to the optical pickup head.

4. The method as claimed in claim 3, wherein the step of detecting the cross-track speed and the cross-track direction further comprises:
detecting the cross-track speed according to a cross-track signal or a radio frequency ripple (RFRP) signal, and detecting the cross-track direction according to the cross-track signal and the RFRP signal.

5. The method as claimed in claim 3, wherein the predetermined direction refers to the movement direction of the track of the optical disk moving from inside to outside relative to the optical pickup head.

6. The method as claimed in claim 3, wherein the predetermined direction refers to the movement direction the track of the optical disk moving from outside to inside relative to the optical pickup head.

7. A method of recognizing a track pitch of an optical disk, adapted for an optical disk player, the optical disk player having a spindle motor and an optical pickup head, the spindle motor configured to rotate an optical disk, the optical pickup head configured to read the optical disk, the method comprising:
storing a reference disk data comprising a track pitch of a reference optical disk and an address corresponding to a predetermined read distance;
detecting an eccentric track number of a target optical disk;
driving the optical pickup head to a predetermined position to read a data sector address at a single point on the target optical disk; and
calculating a track pitch of the target optical disk according to the data sector address, the eccentric track number, and the reference disk data, wherein the track pitch is calculated by following equation:

$$ID \times d = \frac{\pi \times [(n \times d + r_0)^2 - r_0^2]}{l},$$

in which ID is the data sector address on the optical disk, d is the track pitch, n is a number of tracks from a beginning track to a specific track, $r_0$ is a distance between a center position of an optical disk and a beginning position of the tracks, l is a length of each of the data sectors.

8. The method as claimed in claim 7, wherein the step of detecting the eccentric track number of the target optical disk comprises:
detecting a cross-track number read by the optical pickup head in a predetermined read rotation number; and
calculating the eccentric track number according to the predetermined read rotation number and the cross-track number.

9. The method as claimed in claim 7, wherein the step of reading the data sector address on the target optical disk further comprises:
detecting a cross-track speed and a cross-track direction; and
when the cross-track speed is lower than a target value and the cross-track direction matches a predetermined direction, reading the data sector address on the target optical disk;
wherein the cross-track direction refers to a movement direction of a track of the target optical disk relative to the optical pickup head.

10. The method as claimed in claim 9, wherein the step of detecting the cross-track speed and the cross-track direction further comprises:
detecting the cross-track speed according to a cross-track signal or a radio frequency ripple (RFRP) signal, and detecting the cross-track direction according to the cross-track signal and the RFRP signal.

11. The method as claimed in claim 9, wherein the predetermined direction refers to the direction which the track of the target optical disk moves from inside to outside relative to the optical pickup head.

12. The method as claimed in claim 9, wherein the predetermined direction refers to the direction which the track of the target optical disk moves from outside to inside relative to the optical pickup head.

* * * * *